United States Patent [19]

Lee

[11] Patent Number: 5,668,608

[45] Date of Patent: Sep. 16, 1997

[54] MOTION VECTOR ESTIMATION METHOD AND APPARATUS FOR USE IN AN IMAGE SIGNAL ENCODING SYSTEM

[75] Inventor: Min-Sup Lee, Seoul, Rep. of Korea

[73] Assignee: Daewoo Electronics Co., Ltd., Seoul, Rep. of Korea

[21] Appl. No.: 507,579

[22] Filed: Jul. 26, 1995

[51] Int. Cl.⁶ .................................................. H04N 9/78
[52] U.S. Cl. .......................... 348/699; 348/416; 235/494; 382/241
[58] Field of Search ................................ 382/241, 242, 382/243, 205, 236; 235/494; 348/416, 699

[56] References Cited

U.S. PATENT DOCUMENTS

| | | | |
|---|---|---|---|
| 4,998,010 | 3/1991 | Chandler et al. | 235/494 |
| 5,295,201 | 3/1994 | Yokohama | 382/236 |
| 5,541,660 | 7/1996 | Kim et al. | 348/416 |
| 5,581,308 | 12/1996 | Lee | 348/699 |

*Primary Examiner*—Leo Boudreau
*Assistant Examiner*—Daniel G. Mariam
*Attorney, Agent, or Firm*—Anderson Kill & Olick P.C.

[57] ABSTRACT

An inventive apparatus estimates correct motion vectors between a current and its previous frames for feature points selected from the previous frame. A motion vector detector first determines a set of initial motion vectors for the feature points. Subsequently, a displacement generator provides N number of displacements to an initial motion vector of a selected feature point to thereby produce a set of N candidate motion vectors for the selected feature point, wherein the selected feature point is surrounded by its, e.g., six neighboring feature points to form a previous hexagon having a set of six triangles. And then, a predictor provides quasi-feature points in the current frame from the neighboring feature points through the use of the initial motion vectors thereof; and also generates a set of N selected quasi-feature points from the selected feature point by using the N candidate motion vectors. And a weight factor generator selectively generates one from a multiplicity of weigh factors based on position data of each of the pixels in the current hexagon and each of the N subject quasi-feature points. Finally, a motion vector selector selects a motion vector from the N candidate motion vectors corresponding to a set of six triangles in the current hexagon which yields a minimum error value among N error values obtained through the use of the weight factors between the current and the previous hexagons.

6 Claims, 4 Drawing Sheets

FEATURE POINT

MOTION VECTOR ESTIMATION METHOD AND APPARATUS FOR USE IN AN IMAGE SIGNAL ENCODING SYSTEM

FIELD OF THE INVENTION

The present invention relates to a motion vector estimation method and apparatus for use in an image signal encoding system; and, more particularly, to a method and apparatus capable of correctly estimating motion vectors for selected feature points using an improved feature point based motion estimation technique.

DESCRIPTION OF THE PRIOR ART

As is well known, transmission of digitized image signals can deliver video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data through the limited channel bandwidth, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse code modulation), two-dimensional DCT(discrete cosine transform), quantization of DCT coefficients, and VLC(variable length coding). The motion compensated DPCM is a process of determining the movement of an object between a current frame and its previous frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12 (December 1985); and in Ninomiya and Ohtsuka, "A Motion-Compensated Interframe Coding Scheme for Television Pictures", *IEEE Transactions on Communications*, COM-30, No. 1 (January 1982).

Specifically, in the motion compensated DPCM, current frame data is predicted from the corresponding previous frame data based on an estimation of the motion between the current and the previous frames. Such estimated motion may be described in terms of two dimensional motion vectors representing the displacement of pixels between the previous and the current frames.

There have been proposed many approaches to estimate the displacement of pixels of an object. One of the motion estimation techniques comprises a pixel-by-pixel motion estimation using feature points, wherein each of the feature points is defined as a pixel point capable of representing its neighboring pixels. In the motion estimation technique utilizing the feature points, a number of feature points are first selected from all of the pixels contained in the previous frame. Then, motion vectors for the selected feature points are determined by employing a block matching algorithm, wherein each of the motion vectors represents a spatial displacement between one feature point in the previous frame and a corresponding matching point, i.e., a most similar pixel, in the current frame. Specifically, the matching point for each of the feature points is searched in a search region within the current frame, wherein the search region is defined as a region within a predetermined area which encompasses the position of its corresponding feature point. However, in the pixel-by-pixel motion estimation, it is not easy to estimate the true motion of, e.g., a feature point, if all pixels in the block do not move in a same way.

Another type of motion estimation technique for use in estimating motion vectors for feature points is disclosed in a copending, commonly assigned application, U.S. Ser. No. 08/446,351, U.S. Pat. No. 5,581,308, entitled "METHOD AND APPARATUS FOR DETERMINING TRUE MOTION VECTORS FOR SELECTED PIXELS".

In the disclosed method and apparatus for determining true motion vectors for feature points included in a previous frame, a set of initial motion vectors for the feature points are determined first. Subsequently, a predetermined N number of displacements are provided to an initial motion vector of a selected feature point, thereby producing a subset of N candidate motion vectors for the selected feature point. The selected feature point is surrounded by its, e.g., four neighboring feature points to form a previous rhombus having a set of four triangles. And then, quasi-feature points are provided in a current frame from the neighboring feature points through the use of the initial motion vectors thereof; and a set of N selected quasi-feature points is also generated from the selected feature point by using the N candidate motion vectors. The four quasi-feature points constitute a current rhombus which has N sets of four triangles defined by the N selected quasi-feature points. Finally, a true motion vector is selected from the N candidate motion vectors in the subset, wherein the true motion vector is a candidate motion vector of the subset corresponding to a set of four triangles in the current rhombus which yields a minimum error value between the current and the previous rhombuses.

Since, however, the prior art apparatus performs to derive the minimum error value without considering the distance between the position of a selected quasi-feature point in the set and that of each pixel in the current rhombus, it may not always provide a true motion vector for a feature point corresponding to the selected quasi-feature point.

SUMMARY OF THE INVENTION

It is, therefore, a primary object of the present invention to provide an improved method and apparatus, for use in an image signal encoding system, for correctly estimating motion vectors for feature points through the use of an improved feature point based motion estimation technique, thereby improving the performance of the system.

In accordance with one aspect of the present invention, there is provided a method, for use in an image signal encoding system, for estimating a set of motion vectors for feature points, each of the feature points being defined in terms of a position of a pixel located at a node of a hexagon grid mapped on a previous frame, the method comprising the steps of:

(a) assigning each of the feature points as a subject feature point in sequence, wherein the subject feature point is surrounded by its six neighboring feature points, to thereby define a previous hexagon, the previous hexagon having a set of six triangle regions, each of the triangles being formed by connecting the subject feature point and its two neighboring feature points;

(b) detecting a first set of initial motion vectors for the feature points between a current frame and the previous frame;

(c) storing the first set of initial motion vectors;

(d) defining a current hexagon in the current frame corresponding to each previous hexagon using the first set of initial motion vectors;

(e) sequentially adding each of the initial motion vectors for its corresponding subject feature point to one of predetermined N displacements, to thereby produce a set of N candidate motion vectors;

(f) deriving a predicted pixel, for each pixel contained in each set of six triangles within each current hexagon, from the previous frame, and producing position data of each pixel in said each set;

(g) producing a differential pixel value for said each pixel contained in said each set of six triangles by subtracting the predicted pixel value from the pixel value of said each pixel;

(h) selectively assigning a predetermined weight factor in response to the position data of each pixel in said each set and a pixel corresponding to each of the N candidate motion vectors;

(i) multiplying the differential pixel value with its corresponding weight factor to thereby derive a weighted differential pixel value;

(j) calculating N error values for said N sets of six triangles in said each current hexagon by averaging the weighted differential pixel values corresponding thereto;

(k) comparing said N error values to select a minimum error value;

(l) choosing a motion vector, which corresponds to the selected minimum error value, from each set of N candidate motion vectors;

(m) updating the stored initial motion vector for the subject feature point with the chosen motion vector; and (n) repeating said steps (d) to (m) until all of the initial motion vectors are updated.

In accordance with another aspect of the present invention, there is provided an apparatus, for use in an image signal encoding system, for estimating a set of motion vector for feature points, each of the feature points being defined in terms of a position of a pixel located at a node of a hexagon grid mapped on a previous frame, which comprises:

means for sequentially assigning each of the feature points as a subject feature point, wherein the subject feature point is surrounded by its six neighboring feature points, to thereby define a previous hexagon, the previous hexagon having a set of six triangle regions, each of the triangles being formed by connecting the subject feature point and its two neighboring feature points;

means for detecting a first set of initial motion vectors for the feature points between a current frame and the previous frame;

means for storing the first set of initial motion vectors;

means for defining a current hexagon in the current frame corresponding to each previous hexagon using the first set of initial motion vectors;

means for sequentially adding each of the initial motion vectors for its corresponding subject feature point to one of predetermined N displacements, to thereby produce a set of N candidate motion vectors;

means for deriving a predicted pixel, for each pixel contained in each set of six triangles within each current hexagon, from the previous frame, and producing position data of each pixel in said each set;

means for producing a differential pixel value for said each pixel contained in said each set of six triangles by subtracting the predicted pixel value from the pixel value of said each pixel;

means for selectively assigning a predetermined weight factor in response to the position data of each pixel in said each set and a pixel corresponding to each of the N candidate motion vectors;

means for multiplying the differential pixel value with its corresponding weight factor to thereby derive a weighted differential pixel value;

means for calculating N error values for said N sets of six triangles in said each current hexagon by averaging the weighted differential pixel values corresponding thereto;

means for comparing said N error values to select a minimum error value and for choosing a motion vector, which corresponds to the selected minimum error value, from each set of N candidate motion vectors;

means for updating the initial motion vector stored in the storage means for the subject feature point with the selected motion vector; and means for retrieving the updated motion vectors as the set of motion vectors when all of the initial motion vectors have been updated.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
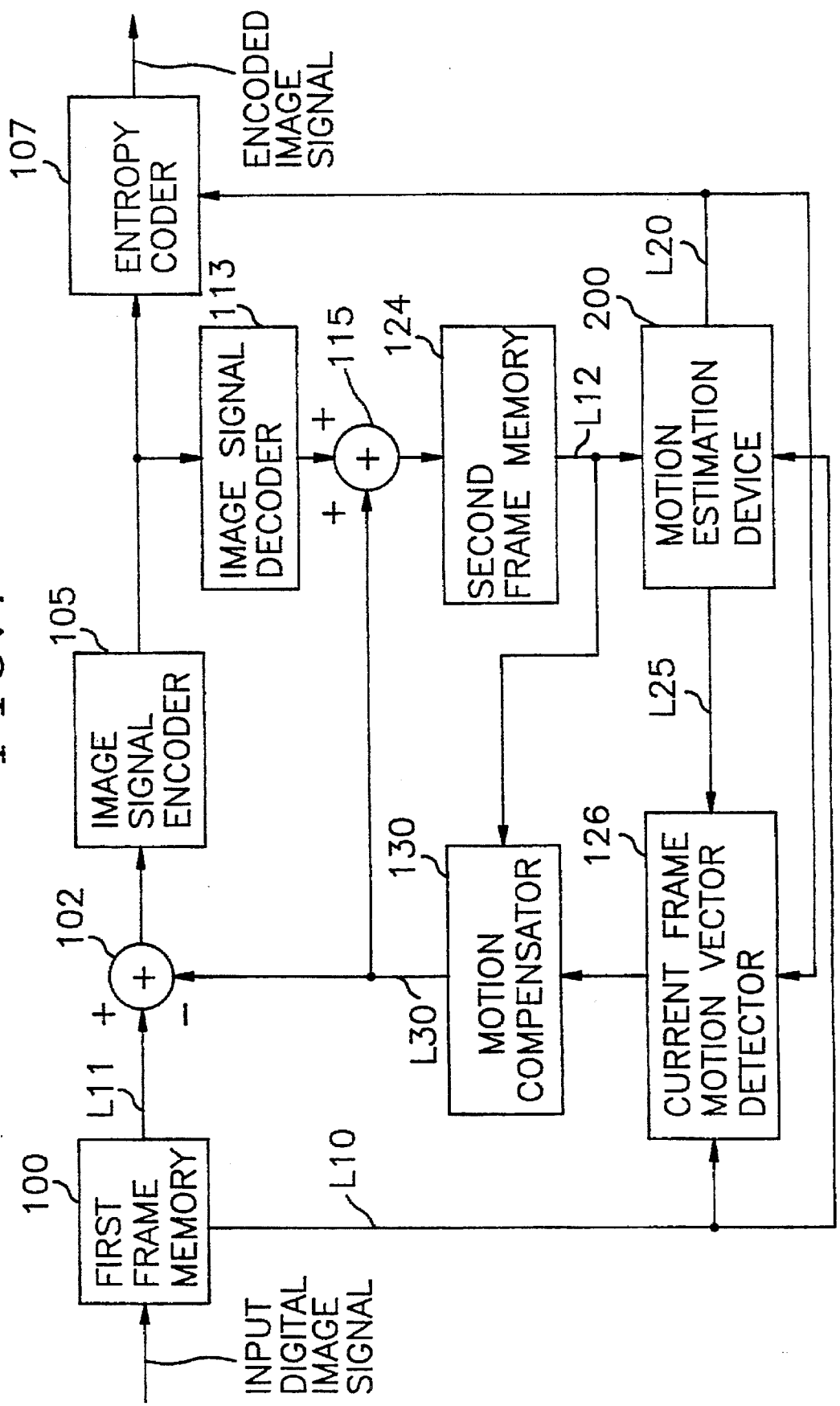
FIG. 1 is a block diagram of an image signal encoding system employing a novel motion estimation device of the present invention.

Referring to FIG. 1, there is shown a block diagram of an image signal encoding system which employs the novel motion estimation device 200 of the present invention. An input digital image signal is stored as a current frame signal in a first frame memory 100.

At the motion estimation device 200, the current frame signal on a line L10 retrieved from the first frame memory 100 and a reconstructed previous frame signal on a line L12 from a second frame memory 124 are processed to generate an estimated first set of motion vectors for feature points and their position data. Details of the motion estimation device 200 will be described with reference to FIG. 2. The first set of motion vectors from the motion estimation device 200 is applied via a line L20 to a current frame motion vector detector 126 and an entropy coder 107, while the position data for the feature points is fed to the current frame motion vector detector 126 through a line L25.

At the current frame motion vector detector 126, a second set of motion vectors for all of the pixels in the current frame on the line L10 is determined using the first set of motion vectors and the position data on the lines L20 and L25 provided from the motion estimation device 200. In order to determine the second set of motion vectors, quasi-feature points are determined first, wherein the quasi-feature points represent the pixels of the current frame shifted from the feature points of the previous frame by the first set of motion vectors. After determining the quasi-feature points, motion vectors for non-quasi-feature points, which are the remaining pixel points in the current frame, are determined as follows.

First of all, a plurality of non-overlapping polygons, e.g., hexagons, are defined by line segments connecting the quasi-feature points. And then, a predicted position on the previous frame for each pixel contained in each polygon of the current frame is determined based on positional relationships between the quasi-feature points forming said each polygon and their corresponding feature points. Thereafter, a predicted pixel value is obtained from the previous frame for said each pixel based on the predicted position; and then a motion vector for said each of the pixels in the current frame is determined from a displacement between the pixel and its prediction. The determined second set of motion vectors is provided to a motion compensator 130 to generate a predicted current frame on a pixel-by-pixel basis.

The motion compensator 130 retrieves each value of the pixels to be contained in the predicted current frame from the previous frame on the line L12 read from the second frame memory 124 by using each of the motion vectors contained in the second set, thereby providing the predicted current frame signal to a subtractor 102 and an adder 115 through a line L30.

The predicted current frame signal on the line L30 is subtracted from the current frame signal on the line L11 at the subtractor 102; and the resultant data, i.e., a frame difference signal denoting the differential pixel values between the current and the predicted current frame signals, is dispatched to an image signal encoder 105, wherein a frame difference signal is encoded into a set of quantized transform coefficients by using, e.g., a discrete cosine transform (DCT) and a known quantization method.

Thereafter, the quantized transform coefficients are transmitted to an entropy coder 107 and an image signal decoder 113. At the entropy coder 107, the quantized transform coefficients from the image signal encoder 105 and the first set of motion vectors on the line L20 are coded together by using, e.g., a combination of run-length and variable length coding techniques for the transmission thereof. In the meantime, the image signal decoder 113 converts the quantized transform coefficients from the image signal encoder 105 back into a reconstructed frame difference signal by employing an inverse quantization and an inverse DCT.

The reconstructed frame difference signal from the image signal decoder 113 and the predicted current frame signal on the line L30 are combined at the adder 115 to thereby provide a reconstructed frame signal to be written as a previous frame signal onto the second frame memory 124. Reconstruction of the frame difference signal is required in order for the encoder to monitor the behavior of the decoder in a receiver to thereby prevent the current frame signal reconstructed at the encoder from diverging from that of the decoder in the receiver.

Detailed description of the image signal encoding system as set forth above excepting the inventive motion estimation device 200 is disclosed in commonly owned applications, EPC-Application No. 95 106 854.3; and U.S. Ser. No. 08/434,808, U.S. Pat. No. 5,598,216 entitled "METHOD AND APPARATUS FOR ENCODING/DECODING A VIDEO SIGNAL", which is incorporated herein by reference.

Another example of the image signal encoding apparatus which is adapted to determine the motion vectors for the non-quasi-feature points is disclosed in a commonly owned application, U.S. Ser. No. 08/367,520, filed on Dec. 30, 1994, entitled "METHOD AND APPARATUS FOR ENCODING A VIDEO SIGNAL USING PIXEL-BY-PIXEL MOTION PREDICTION", which is also incorporated herein by reference. In the image signal encoding apparatus, a motion vector for each pixel position of the non-quasi-feature points is determined by averaging the motion vectors of the quasi-feature points which are placed within a circle boundary having a radius defined by the summation of the distance to the nearest quasi-feature point from the pixel position and a predetermined expanded radius for including other quasi-feature points to be used in calculating the motion vector.

Figure 2:
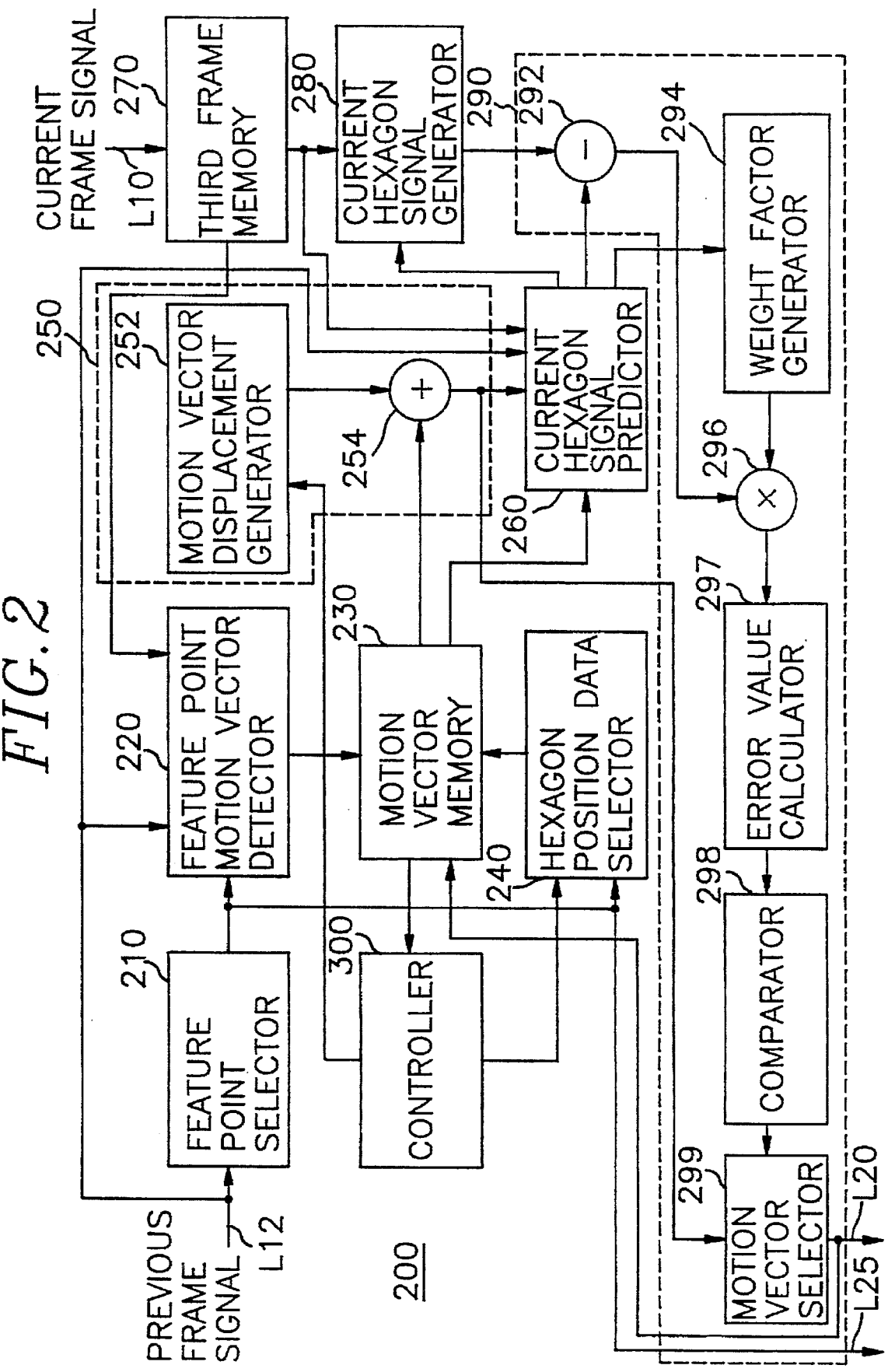
FIG. 2 provides a detailed block diagram of the motion estimation device shown in FIG. 1.

Referring now to FIG. 2, there is illustrated a detailed block diagram of the motion estimation device 200 of the present invention shown in FIG. 1. As shown in FIG. 2, the previous frame signal on the line L12 is applied to a feature point selector 210, a feature point motion vector detector 220 and a current hexagon signal predictor 260. And the current frame signal on the line L10 is inputted to a third frame memory 270 for the storage thereof.

At the feature point selector 210 a number of feature points are selected among the pixels contained in the previous frame. The feature points are those positions which are capable of representing the motions of objects in the previous frame.

Figure 3:
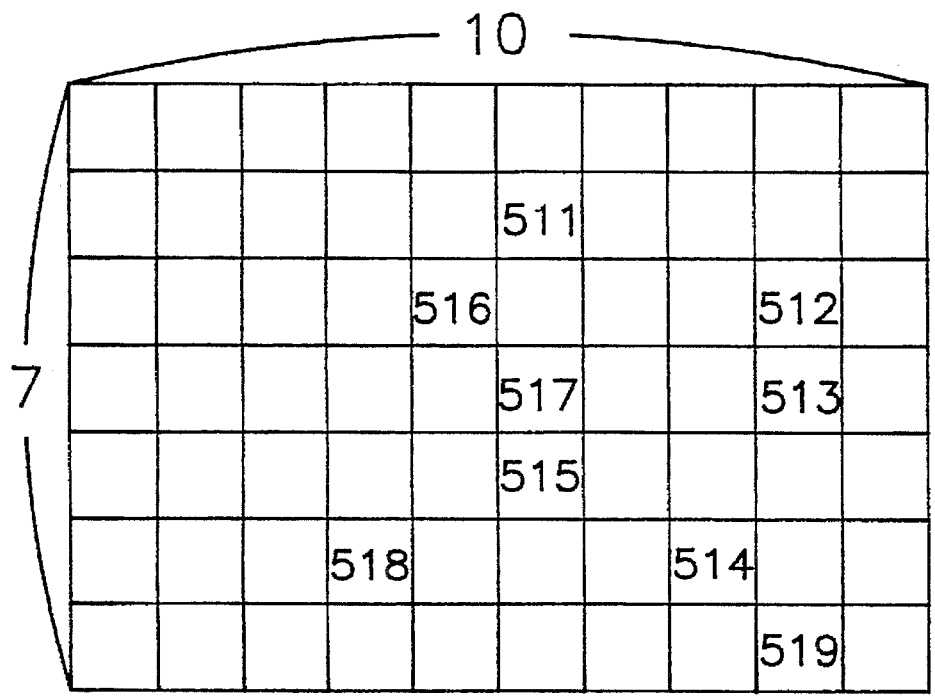
FIG. 3 presents an exemplary frame for defining feature points.

Referring to FIG. 3, there is shown an exemplary frame of 10×7 pixels. If a moving object exists around the center of the frame and the motion of the moving object is successfully represented by a set of pixels, e.g., "511" to "519", then the pixels are selected as the feature points of the frame.

Figure 4:
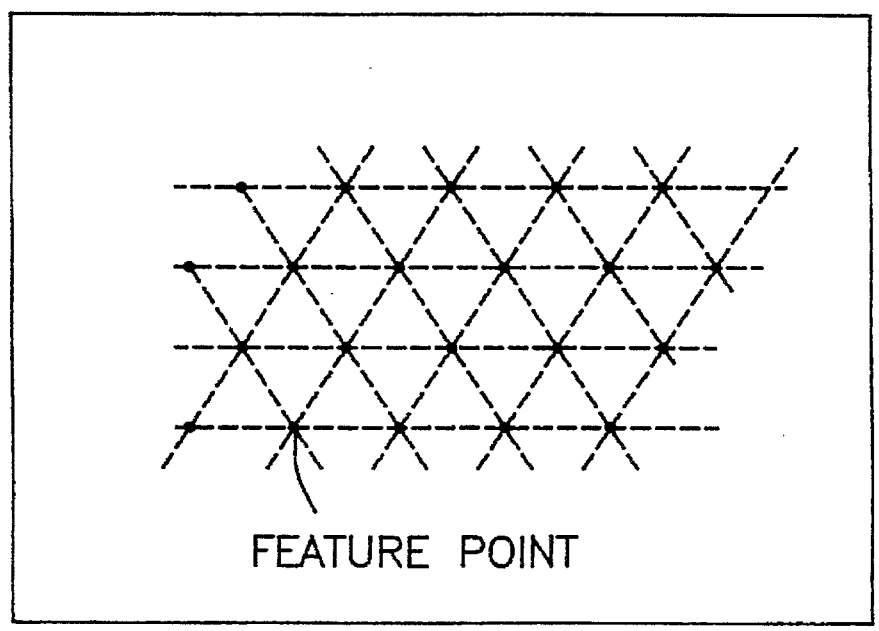
FIG. 4 illustrates a hexagon grid mapped on a previous frame used to select feature points in accordance with a preferred embodiment of the invention.

In a preferred embodiment of the present invention, the feature points are determined by using a grid technique employing various types of grids, e.g., a hexagon grid shown in FIG. 4. As shown in FIG. 4, the feature points are located at the nodes of the grid.

Referring back to FIG. 2, position data of the selected feature points from the feature point selector 210 is supplied to the current frame motion vector detector 126 shown in FIG. 1 through the line L25 and is also fed to the feature point motion vector detector 220 and a hexagon position data selector 240 for the storage thereof.

At the feature point motion vector detector 220, a first set of initial motion vectors for the selected feature points is detected based on the position data of the feature points from the feature point selector 210 and the current frame signal retrieved from the third frame memory 270. Each of the initial motion vectors of the first set represents a spatial displacement between a feature point in the previous frame and a most similar pixel thereto in the current frame. There are numerous processing algorithms available for use to detect the motion vectors on a pixel-by-pixel basis. In a preferred embodiment of the invention, there is used a block matching algorithm. That is, when the position data of a feature point is received from the feature point selector 210, a feature point block of M×M, e.g., 5×5, pixels of the previous frame having the subject feature point at the center thereof is retrieved via the line L12 from the second frame memory 124 shown in FIG. 1, M being a positive integer. Thereafter, a motion vector for the feature point block is determined based on a similarity calculation derived from an error function, e.g., MAE (mean absolute error) or MSE (mean square error), said error function denoting the difference between the feature point block and each of a plurality of equal-sized candidate blocks included in a generally larger search region, e.g., 10×10 pixels, of the current frame retrieved from the third frame memory 270, wherein the motion vector represents a displacement between the feature point block and a candidate block which yields a minimum error function.

The motion vector so determined is then set as the initial motion vector of the feature point. After detecting the initial motion vectors for all of the feature points, the initial motion vectors are applied as the first set of initial motion vectors to a motion vector memory 230 for the storage thereof.

Figure 5A:
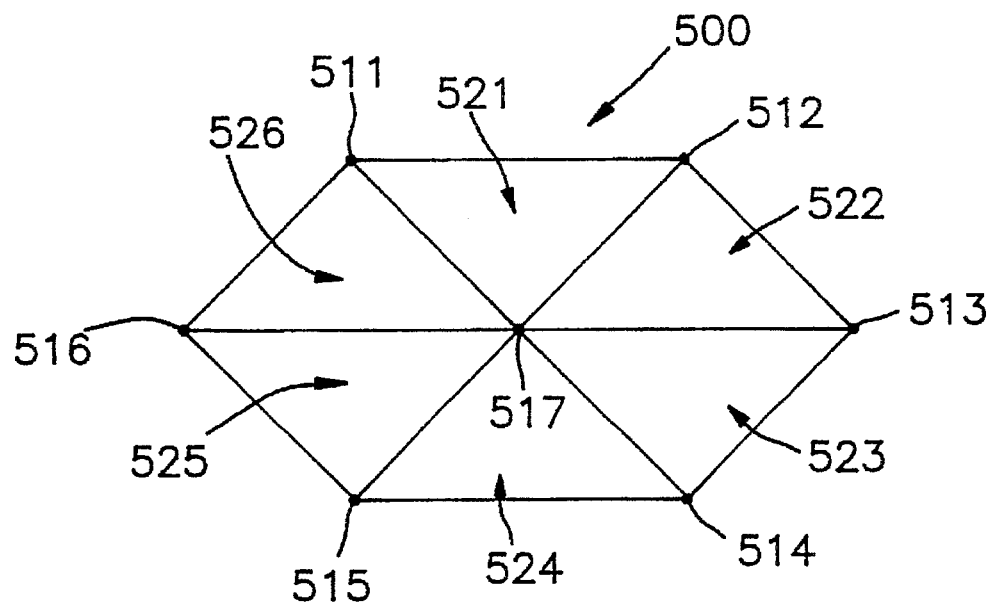
FIGS. 5A and 5B depict the formation of hexagons in a previous frame and a current frame, respectively.

In the meantime, the hexagon position data selector 240 sequentially assigns each of the feature points stored therein as a subject feature point. As illustrated in FIG. 5A, a subject feature point, e.g., 517, is surrounded by its six neighboring feature points 511, 512, 513, 514, 515, 516, which are not selected as the subject feature point at the moment, to thereby form a previous hexagon, e.g., 500, with the subject feature point 517 at the center thereof resulting in a set of six triangle regions 521, 522, 523, 524, 525 and 526. Position data for each of the subject feature points, e.g., 517 and its six neighboring feature points, e.g., 511, 512, 513, 514, 515, 516, which form the previous hexagon 500, is dispatched to the motion vector memory 230. The dispatch operation of the position data from the hexagon position data selector 240 to the motion vector memory 230 is controlled by a first control signal CS1 from a controller 300.

The controller 300, which monitors the storage state of the initial motion vectors stored in the motion vector memory 230, controls the operation of the hexagon position data selector 240 and a motion vector displacement generation device 250 by providing them with the first and a second control signals CS1 and CS2.

In the meanwhile, in response to the position data of the subject feature point from the hexagon position data selector 240, the corresponding initial motion vector stored in the motion vector memory 230 is retrieved to the motion vector displacement generation device 250 in sequence by a predetermined number of times; and in response to the position data for its six neighboring feature points, the corresponding motion vectors are read and sent to the current hexagon signal predictor 260.

The motion vector displacement generation device 250, which includes a motion vector displacement generator 252 and an adder 254, serves to generate a set of N candidate motion vectors per the initial motion vector of each of the subject feature points, N being a positive integer. More specifically, in response to the second control signal CS2 from the controller 300, N number of predetermined displacements prestored in the motion vector displacement generator 252 is sequentially read and supplied to the adder 254. In a preferred embodiment of the present invention, the displacement is preferably set in the range from (0, 0) to (±2, ±2) pixels in the horizontal and vertical directions with respect to each initial motion vector. Accordingly, said N equals to 25 in this case. Thereafter, the N number of displacements and the initial motion vector for each of the subject feature points are sequentially added at the adder 254, to thereby produce the set of N candidate motion vectors per one initial motion vector. The set of N candidate motion vectors is then provided to the current hexagon signal predictor 260 and the motion vector selection device 290.

Figure 5B:
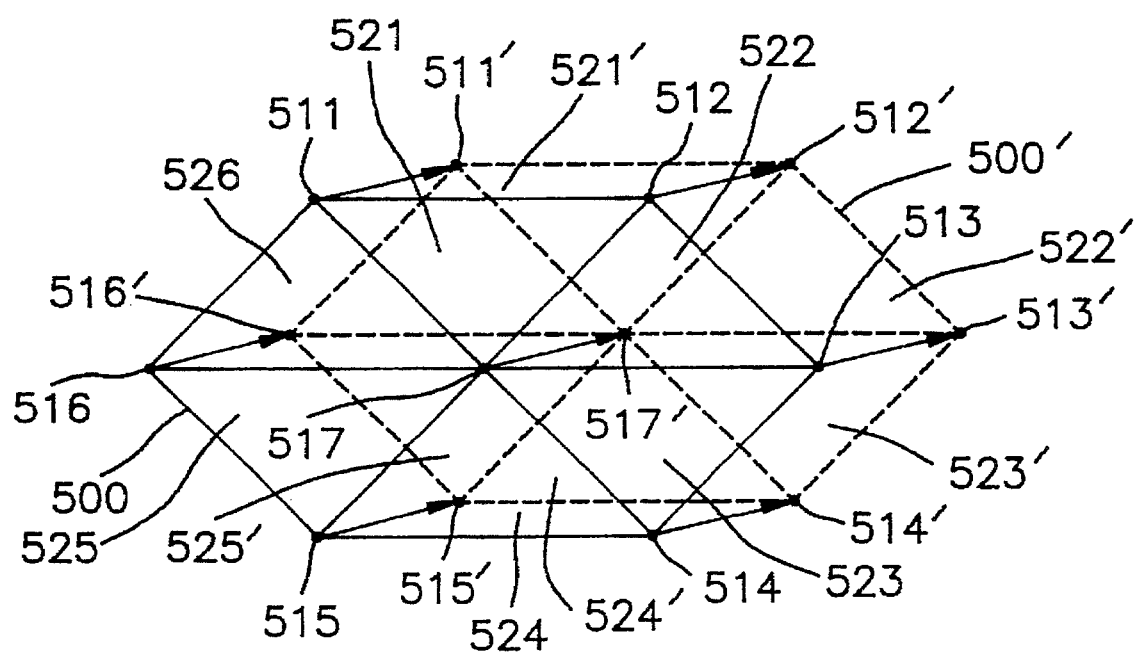

At the current hexagon signal predictor 260, predicted pixel values for all of pixels contained in a current hexagon are derived from the previous frame signal on the line L12. In order to derive the predicted pixel values, first, the initial motion vectors for the six vertexes forming the previous hexagon 500 are read from the motion vector memory 230 and quasi-feature points, e.g., 511', 512', 513', 514', 515' and 516' shown in FIG. 5B, which represent the pixels of the current frame shifted from the six feature points, i.e., the six vertexes, 511, 512, 513, 514, 515 and 516 on the previous hexagon 500 by their corresponding initial motion vectors are determined. After determining the quasi-feature points, a current hexagon, e.g., 500' shown in FIG. 5B, is defined by connecting the six quasi-feature points 511', 512', 513', 514', 515' and 516'.

And then, a set of N subject quasi-feature points, which represents the pixels produced in the current frame by the set of N candidate motion vectors for the subject feature point in the previous hexagon 500, are determined. After determining the quasi-feature points and the N subject quasi-feature points, a set of six triangles is defined for each of the N subject quasi-feature points by connecting said each of the N subject quasi-feature points and its two neighboring quasi-feature points. In FIG. 5B, there is exemplarily illustrated the process of generating of a current hexagon, e.g., 500', by connecting the six quasi-feature points 511', 512', 513', 514', 515' and 516'. The current hexagon 500' has a subject quasi-feature point 517' to thereby form the set of six triangles, e.g., 521', 522', 523', 524', 525' and 526' represented in doted lines as shown in FIG. 5A or 5B, which corresponds to, e.g., the previous hexagon 500. Although it is not specifically shown therein, it should be apparent to those skilled in the art that each current hexagon will have N sets of six triangles due to the N candidate motion vectors derived from the subject feature point 517 in the previous hexagon 500.

Thereafter, prediction for all of pixels within each current hexagon is carried out for each of the N subject quasi-feature points by using a known affine transformation technique. As well known in the art, an arbitrary sequence of rotation, translation and scale changes of a moving object can be represented by the affine transformation.

Assuming, as illustrated in FIG. 5S, that three pixels, i.e., two vertexes 511', 512' and one of the subject quasi-feature points, 517', in the current hexagon 500' are determined as quasi-feature points corresponding to their respective feature points 511, 512 and 517 in the previous hexagon 500, pixels in a triangle 521' of the current hexagon 500' are correlated to those in a triangle 521 of the previous hexagon 500 by the affine transformation defined as:

$$\begin{bmatrix} x' \\ y' \end{bmatrix} = \begin{bmatrix} a & b \\ c & d \end{bmatrix} \cdot \begin{bmatrix} x \\ y \end{bmatrix} + \begin{bmatrix} e \\ f \end{bmatrix}$$

wherein (x, y) represents the x and y coordinates of a pixel within the current hexagon and (x', y'), the coordinates of a predicted pixel position on the previous hexagon; and a, b, c, d, e and f are affine transformation coefficients.

The six affine transform coefficients are obtained by solving six linear equations obtained from three sets of related feature and quasi-feature points, i.e., 511–511', 512–512' and 517–517'. Once the affine transform coefficients are known, each of the remaining pixels in the triangle 521' can be mapped onto a position in the triangle 521 through the use of the affine transformation equation. In this manner, pixels in each triangle included in the current hexagon 500' are predicted from the previous hexagon 500. Pixels on the boundary of two contiguous triangles can be predicted from either one of the two triangles. The process of predicting the pixels in the current hexagon is repeatedly performed until all of the N sets of six triangles are processed. Position data of the original subject quasi-feature point and its six neighboring quasi-feature points forming a current hexagon and position data for all of the pixels contained therein are provided to a current hexagon signal generator 280 which is adapted for generating a current hexagon signal. And position data of each of the N subject quasi-feature points and each of the pixels contained in the current hexagon are supplied to the motion vector selection device 290. Subsequently, each of the predicted pixel values corresponding to each set of six triangles is supplied to the motion vector selection device 290.

The current hexagon signal generator 280 sequentially retrieves each of pixel values in the current hexagon from the third frame memory 270 in response to its corresponding position data from the current hexagon signal predictor 260 to thereby provide each pixel value to the motion vector selection device 290. The motion vector selection device 290 includes a subtractor 292, a weight factor generator 294, a multiplier 296, an error value calculator 297, a comparator 298 and a motion vector selector 299.

The subtractor 292 then derives differential pixel values for each set of six triangles of the current hexagon by subtracting the predicted pixel values supplied from the current hexagon signal predictor 260 from the corresponding pixel values provided from the current hexagon signal generator 280. Subsequently, the differential pixel values derived at the subtractor 292 are sequentially supplied to the multiplier 296.

In the meanwhile, in response to the position data of each of the pixels in the current hexagon and that of each of the N subject quasi-feature points from the current hexagon signal predictor 260, the weight factor generator 296 of the present invention selectively generates any one from a multiplicity of weigh factors prestored therein. In accordance with the present invention, the weight factors are preferably set based on the concept that the nearer the position of each of the pixels in the current hexagon to each of the N subject quasi-feature points, the greater the weight factor thereof ought to be. This is because pixels that are closer to the subject quasi-feature point are more important than pixels that are farther away in deriving an exact motion vector for the feature point corresponding to the subject quasi-feature point. In a preferred embodiment of the invention, the weight factor is determined in the range from 0.4 to 1. The weight factors, for instance, may be represented as shown in Table(wherein it is assumed that the range intervals have a size of 1.9 and the weight factor ranges from 0.4 to 1):

TABLE

Weight Factors as a Function of Distance from the Subject Quasi-Feature Point

| Distance range between the position of a subject quasi-feature point and that of each pixel in the current hexagon | Weight factor |
| --- | --- |
| 0–1.9 | 1 |
| 2–3.9 | 0.8 |
| 4–5.9 | 0.6 |
| 6– | 0.4 |

As can be seen from the Table, if the distance between the position of each subject quasi-feature point and that of each pixel in the current hexagon exists between 0 and 1.9, the weight factor thereof is selected as 1; and, if the distance therebetween is within the range from 4 to 5.9, it is chosen as 0.6, and so on. Thereafter, each of the differential pixel values from the subtractor 292 and its corresponding weight factor from the weight factor generator 294 are simultaneously fed to the multiplier 296.

The multiplier 296 multiplies the differential pixel value from the subtractor 292 with the corresponding weight factor from the weight factor generator 294 to thereby provide a weighted differential pixel value to the error value calculator 297. At the error value calculator 297, an error value for each set of six triangles of a current hexagon is calculated by averaging the weighted differential pixel values corresponding thereto to produce a set of N error values per each of the predicted current hexagons. Each set of N error values is then provided to the comparator 298.

The comparator 298 compares N error values in said each set to thereby select a minimum error value from said set. Through the comparison process, the comparator 298 generates, for each current hexagon, a selection signal indicating the motion vector with the selected minimum error value and then provides the selection signal to the motion vector selector 299. The motion vector selector 299, in response to the selection signal from the comparator 298, chooses a motion vector, which corresponds to the selected minimum error value, from the set of N candidate motion vectors stored therein as the motion vector for each of the selected feature points. The chosen motion vector for each of the feature points is then provided to the current frame motion vector detector 126 shown in FIG. 1 through the line L20; and is also fed to the motion vector memory 230 to update the motion vector for the subject feature point stored therein with the chosen motion vector. It should be appreciated that the updated motion vector for the subject feature point may be used in deriving motion vectors for its neighboring feature points as a reference motion vector.

While the present invention has been described with respect to the particular embodiments, it will be apparent to those skilled in the art that various changes and modifications may be made without departing from the spirit and scope of the invention as defined in the following claims.

What is claimed is:

1. A method, for use in an image signal encoding system, for estimating a set of motion vectors for feature points, each of the feature points being a pixel point located at a node of a hexagon grid mapped on a previous frame, the method comprising the steps of:

(a) assigning each of the feature points as a subject feature point in sequence, wherein the subject feature point is surrounded by its six neighboring feature points, to thereby define a previous hexagon, the previous hexagon having a set of six triangle, each of the triangles being formed by connecting the subject feature point and its two neighboring feature points;

(b) detecting a first set of initial motion vectors for the feature points between a current frame and the previous frame;

(c) storing the first set of initial motion vectors;

(d) defining a current hexagon in the current frame corresponding to each previous hexagon by using the first set of initial motion vectors;

(e) sequentially adding each of the initial motion vectors for its corresponding subject feature point to one of predetermined N displacements, to thereby produce a set of N candidate motion vectors per one initial motion vector;

(f) deriving a predicted pixel value, for each pixel contained in each set of six triangles within each current hexagon, from the previous frame, and producing position data of each pixel in said each set;

(g) producing a differential pixel value for said each pixel contained in said each set of six triangles by subtracting the predicted pixel value from the pixel value of said each pixel;

(h) selectively assigning a predetermined weight factor in response to the position data of each pixel in said each set and that of a feature point in the current hexagon corresponding to each of the N candidate motion vectors;

(i) multiplying the differential pixel value with its corresponding weight factor to thereby produce a weighted differential pixel value;

(j) deriving N error values for said N sets of six triangles in said each current hexagon by averaging the weighted differential pixel values corresponding thereto;

(k) comparing said N error values to select a minimum error value;

(l) choosing a motion vector, which corresponds to the selected minimum error value, from each set of N candidate motion vectors;

(m) updating the stored initial motion vector for the subject feature point with the chosen motion vector; and (n) repeating said steps (d) to (m) until all of the initial motion vectors are updated.

2. The method of claim 1, wherein said step (d) of defining the current hexagon includes the step of:

determining quasi-feature points in the current frame based on the feature points and the motion vectors thereof, wherein the current hexagon is formed by connecting the quasi-feature points which correspond to the feature points defining the previous hexagon.

3. The method of claim 2, wherein said step (f) of deriving the pixel value includes the steps of:

determining a predicted position on the previous frame for said each pixel based on the positional relationships between the quasi-feature points forming said each triangle and their corresponding feature points; and providing the predicted pixel value for said each pixel based on the predicted position.

4. An apparatus, for use in an image signal encoding system, for estimating a set of motion vector for feature points, each of the feature points being a pixel point located at a node of a hexagon grid mapped on a previous frame, which comprises:

means for sequentially assigning each of the feature points as a subject feature point, wherein the subject feature point is surrounded by its six neighboring feature points, to thereby define a previous hexagon, the previous hexagon having a set of six triangle regions, each of the triangles being formed by connecting the subject feature point and its two neighboring feature points;

means for detecting a first set of initial motion vectors for the feature points between a current frame and the previous frame;

means for storing the first set of initial motion vectors;

means for defining a current hexagon in the current frame corresponding to each previous hexagon by using the first set of initial motion vectors;

means for sequentially adding each of the initial motion vectors for its corresponding subject feature point to one of predetermined N displacements, to thereby produce a set of N candidate motion vectors;

means for deriving a predicted pixel, for each pixel contained in each set of six triangles within each current hexagon, from the previous frame, and producing position data of each pixel in said each set;

means for producing a differential pixel value for said each pixel contained in said each set of six triangles by subtracting the predicted pixel value from the pixel value of said each pixel;

means for selectively assigning a predetermined weight factor in response to the position data of each pixel in said each set and that of a feature point in the current frame corresponding to each of the N candidate motion vectors;

means for multiplying the differential pixel value with its corresponding weight factor to thereby produce a weighted differential pixel value;

means for calculating N error values for said N sets of six triangles in said each current hexagon by averaging the weighted differential pixel values corresponding thereto;

means for comparing said N error values to select a minimum error value and for choosing a motion vector, which corresponds to the selected minimum error value, from each set of N candidate motion vectors;

means for updating the initial motion vector stored in the storage means for the subject feature point with the chosen motion vector; and means for retrieving the updated motion vectors as the set of motion vectors when all of the initial motion vectors have been updated.

5. The apparatus of claim 4, wherein said means for defining the current hexagon includes:

means for determining quasi-feature points in the current frame based on the feature points and the motion vectors thereof, wherein the current hexagon is formed by connecting the quasi-feature points which correspond to the feature points defining the previous hexagon.

6. The apparatus of claim 5, wherein said means for deriving the predicted pixel values includes:

means for determining a predicted position on the previous frame for said each pixel based on the positional relationships between the quasi-feature points forming said each triangle and their corresponding feature points; and means for providing the predicted pixel value for said each pixel based on the predicted position.

* * * * *